US00RE35407E

United States Patent [19]

Wiesenfeldt et al.

[11] E Patent Number: Re. 35,407

[45] Reissued Date of Patent: Dec. 17, 1996

[54] AZO DYE POLYMERS

[75] Inventors: Matthias Wiesenfeldt; Sabine Gruettner-Merten, both of Mutterstadt; Ruediger Sens, Mannheim; Karl-Heinz Etzbach, Frankenthal; Heike Kilburg, Speyer, all of Germany

[73] Assignee: BASF Aktiengesellschaft, Ludwigshafen, Germany

[21] Appl. No.: 223,852

[22] Filed: Apr. 6, 1994

Related U.S. Patent Documents

Reissue of:

[64] Patent No.: 5,264,507
Issued: Nov. 23, 1993
Appl. No.: 949,156
Filed: Sep. 23, 1992

[30] Foreign Application Priority Data

Oct. 1, 1991 [DE] Germany ..... 4132685

[51] Int. Cl.[6] ..... C08F 228/06; C08F 226/02; C08F 220/18; C08F 212/06

[52] U.S. Cl. ..... 526/256; 526/258; 526/265; 526/312; 526/329.2; 526/347

[58] Field of Search ..... 526/256, 258, 526/265, 312, 329.2, 347

[56] References Cited

U.S. PATENT DOCUMENTS

| | | | |
|---|---|---|---|
| 3,190,860 | 6/1965 | Fertig et al. | 526/312 |
| 3,507,850 | 4/1970 | Cohen et al. | 534/573 |
| 4,239,868 | 12/1980 | Bonnet et al. | 525/279 |
| 4,505,857 | 3/1985 | Egli | 534/768 |
| 4,843,153 | 6/1989 | Eiligsfeld et al. | 534/752 |

FOREIGN PATENT DOCUMENTS

| | | |
|---|---|---|
| 0201896 | 11/1986 | European Pat. Off. . |
| 1468540 | 2/1966 | France . |
| 2378807 | 8/1978 | France . |
| 3108077 | 1/1982 | Germany . |
| 91/09842 | 7/1991 | WIPO . |

OTHER PUBLICATIONS

Journal of Polymer Science, Polymer Chemistry Edition, Bd, 28, 1–13, Jan. 15, 1990, New York, USA.
Chemistry & Industry, Oct. 1, 1990, pp. 600–608.
Journal of Polymer Science: Part A: Polymer Chemistry, vol. 28, pp. 1–13 (1990), Douglas R. Robello, "Linear Polymers for Nonlinear Optics I. Polyacrylates Bearing Aminonitro–Stilbene and –Azobenzene Dyes", Chemistry & Industry, Oct. 1, 1990, pp. 600–608, Carole Jones, "Polymers for Non–Linear Optical Devices".

*Primary Examiner*—Joseph L. Schofer
*Assistant Examiner*—Wu C. Cheng
*Attorney, Agent, or Firm*—Oblon, Spivak, McClelland, Maier & Neustadt, P.C.

[57] ABSTRACT

Azo dye polymers useful in nonlinear optics contain as characteristic monomer units radicals of the formulae I, II, III and IV (I)

(II)

(III)

(IV)

where

D is the radical of a heterocyclic diazo component, $R^1$ and $R^2$ are each hydrogen, $C_1$–$C_6$-alkyl or substituted or unsubstituted $C_1$–$C_6$-alkoxy, and $R^2$ may also be $C_1$–$C_4$-alkanoylamino, $R^3$ is hydrogen, $C_1$–$C_6$-alkyl, $C_5$–$C_7$-cycloalkyl or $C_3$–$C_4$-alkenyl, $R^4$ is hydrogen, deuterium, methyl, trideuterated methyl or chlorine, $R^5$ is hydrogen or deuterium, $Y^1$ and $Y^2$ are each substituted or unsubstituted $C_2$–$C_{10}$-alkylene, W is oxygen, imino or $C_1$–$C_4$-alkylimino, and X is hydroxyl, substituted or unsubstituted $C_1$–$C_6$-alkoxy, phenoxy, amino or mono- or di($C_1$–$C_4$-alkyl)amino, and have an average molecular weight of from 1,000 to 100,000.

2 Claims, No Drawings

AZO DYE POLYMERS

Matter enclosed in heavy brackets [ ] appears in the original patent but forms no part of this reissue specification; matter printed in italics indicates the additions made by reissue.

The present invention relates to novel azo dye polymers containing as characteristic monomer units radicals of the formulae I, II, III and IV

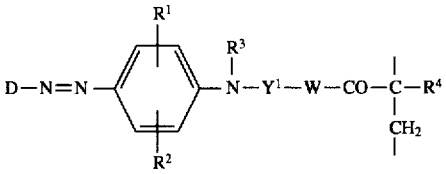

(I)

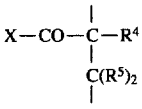

(II)

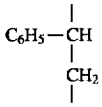

(III)

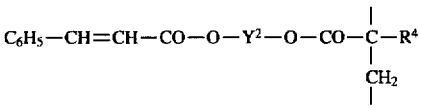

(IV)

where

D is the radical of a diazo component derived from a five-membered aromatic heterocyclic amine having one to three hetero atoms selected from the group consisting of nitrogen, oxygen and sulfur in the heterocyclic ring and optionally fused to a benzene, thiophene, pyridine or pyrimidine ring.

$R^1$ and $R^2$ are each independently of the other hydrogen, $C_1$–$C_6$-alkyl or $C_1$–$C_6$-alkoxy optionally substituted by phenyl or $C_1$–$C_4$-alkoxy, and $R^2$ may also be $C_1$–$C_4$-alkanoylamino, $R^3$ is hydrogen, $C_1$–$C_6$-alkyl, $C_5$–$C_7$-cycloalkyl or $C_3$–$C_4$-alkenyl, $R^4$ is hydrogen, deuterium, methyl, trideuterated methyl or chlorine, $R^5$ is hydrogen or deuterium, $Y^1$ and $Y^2$ are each independently of the other $C_2$–$C_{10}$-alkylene optionally interrupted by 1 to 3 oxygen atoms in the other function or imino or $C_1$–$C_4$-alkylimino groups, W is oxygen, imino or $C_1$–$C_4$-alkylimino, and X is hydroxyl, $C_1$–$C_6$-alkoxy, trideuterated methoxy, 2,3-epoxypropoxy, phenoxy, amino or $C_1$–$C_4$-mono- or dialkylamino, the proportion of monomer units of the formula I being from 1 to 100 mol %, the proportion of monomer units of the formula II being from 0 to 99 mol %, the proportion of monomer units of the formula III being from 0 to 99 mol % and the proportion of monomer units of the formula IV being from 0 to 75 mol %, each percentage being based on the polymer, and the average molecular weight of the polymer being from 1,000 to 100,000, to the use thereof in nonlinear optics and to the use of monomeric azo dyes for preparing the novel polymers.

J. Polymer Sci., Part A, Polymer Chem. 28 (1990), 1–13, disclosed polymers with azo dye chromophores in the side chains. The azo dyes there are members of the azobenzene series. However, it has been found that such polymers are still deficient when used in nonlinear optical systems.

It is an object of the present invention to provide novel polymers which likewise posses donor/acceptor-substituted azo dyes as chromophore in the side chain and which shall be advantageous for use in nonlinear optical systems.

We have found that this object is achieved by the azo dye polymers defined at the beginning.

Suitable radicals D in the formula I are derived for example from a heterocyclic amine of the pyrrole, furan, thiophene, pyrazole, imidazole, oxazole, isoxazole, thiazole, isothiazole, triazole, oxadiazole, thiadiazole, benzofuran, benzothiophene, benzimidazole, benzoxazole, benzothiazole, benzisothiazole, pyridothiophene, pyrimidothiophene, thienothiophene or thienothiazole series.

Of particular suitability are those radicals D derived from a heterocyclic amine of the pyrrole, thiophene, pyrazole, thiazole, isothiazole, triazole, thiadiazole, benzothiophene, benzothiazole, benzisothiazole, pyridothiophene, pyrimidothiophene, thienothiophene or thienothiazole series.

Of particular note are radicals D derived from aminoheterocycles of the formulae

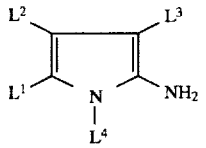

(VIa)

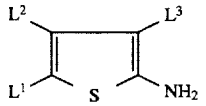

(VIb)

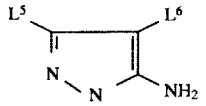

(VIc)

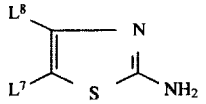

(VId)

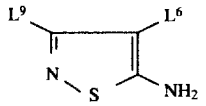

(VIe)

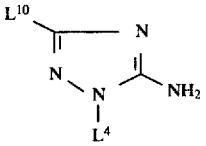

(VIf)

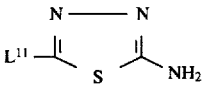

(VIg)

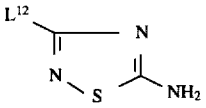

(VIh)

-continued

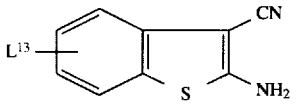
(VIi)

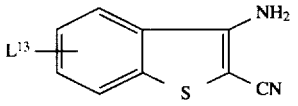
(VIj)

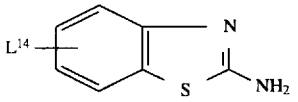
(VIk)

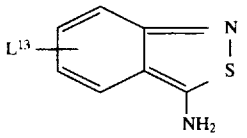
(VIl)

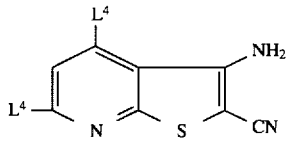
(VIm)

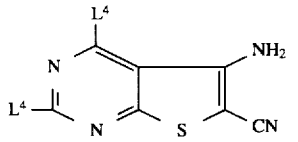
(VIn)

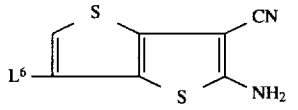
(VIo)

and

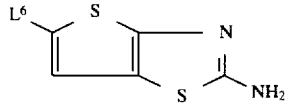
(VIp)

where $L^1$ is nitro, cyano, $C_1$–$C_6$-alkanoyl, benzoyl, $C_1$–$C_6$-alkylsulfonyl, substituted or unsubstituted phenylsulfonyl or a radical of the formula —CH=T, where T is the radical of an acidic CH compound, $L^2$ is hydrogen, $C_1$–$C_6$-alkyl, halogen, hydroxyl, mercapto, unsubstituted or phenyl- or $C_1$–$C_4$-alkoxy-substituted $C_1$–$C_6$-alkoxy, substituted or unsubstituted phenoxy, unsubstituted or phenyl-substituted $C_1$–$C_6$-alkylthio, substituted or unsubstituted phenylthio, $C_1$–$C_6$-alkylsulfonyl or substituted or unsubstituted phenylsulfonyl, $L^3$is cyano, $C_1$–$C_4$-alkoxycarbonyl or nitro, $L^4$ is hydrogen, $C_1$–$C_6$-alkyl or phenyl, $L^5$ is $C_1$–$C_6$-alkyl or phenyl, $L^6$ is cyano, $C_1$–$C_4$-alkoxycarbonyl, $C_1$–$C_6$-alkanoyl or halogen, $L^7$ is nitro, cyano, $C_1$–$C_6$-alkanoyl, benzoyl, $C_1$–$C_6$-alkylsulfonyl, substituted or unsubstituted phenylsulfonyl or a radical of a formula —CH=T, where T is as defined above, $L^8$ is hydrogen, $C_1$–$C_6$-alkyl, halogen, unsubstituted or phenyl- or $C_1$–$C_4$-alkoxy-substituted $C_1$–$C_6$-alkoxy, unsubstituted or phenyl-substituted $C_1$–$C_6$-alkylthio, substituted or unsubstituted phenylthio, $C_1$–$C_6$-alkylsulfonyl, substituted or unsubstituted phenylsulfonyl or $C_1$–$C_4$-alkoxycarbonyl, $L^9$ is cyano, unsubstituted or phenyl-substituted $C_1$–$C_6$-alkyl, unsubstituted or phenyl-substituted $C_1$–$C_6$-alkylthio, substituted or unsubstituted phenyl, thienyl, $C_1$–$C_4$-alkylthienyl, pyridyl or $C_1$–$C_4$-alkylpyridyl, $L^{10}$ is phenyl or pyridyl, $L^{11}$ is trifluoromethyl, nitro, $C_1$–$C_6$-alkyl, phenyl, unsubstituted or phenyl-substituted $C_1$–$C_6$-alkylthio or $C_1$–$C_4$-dialkylamino, $L^{12}$ is $C_1$–$C_6$-alkyl, phenyl, 2-cyanoethylthio or 2-($C_1$–$C_4$-alkoxycarbonyl)ethylthio, $L^{13}$ is hydrogen, nitro or halogen, and $L^{14}$ is hydrogen, cyano, nitro or halogen.

Any substituted phenyl appearing in the azo dye polymers according to the invention may have as substituents for example $C_1$–$C_4$-alkyl, $C_1$–$C_4$-alkoxy or halogen, in particular chlorine or bromine. These phenyl rings will in general have from 1 to 3 substituents.

Any alkyl, alkylene or alkenyl groups appearing in the abovementioned formulae may be not only straight-chain but also branched.

$R^1$, $R^2$, $R^3$, $L^2$, $L^4$, $L^5$, $L^8$, $L^9$, $L^{11}$ and $L^{12}$ are each for example methyl, ethyl, propyl, isopropyl, butyl, isobutyl, sec-butyl, pentyl, isopentyl, neopentyl, tertpentyl, hexyl or 2-methylpentyl.

$R^2$ may also be for example formylamino, acetylamino, propionylamino or butynylamino.

$L^9$ may also be for example benzyl or 1- or 2-phenylethyl.

$L^2$, $L^8$, $L^9$ and $L^{11}$ may each also be for example methylthio, ethylthio, propylthio, isopropylthio, butylthio, isobutylthio, pentylthio, hexylthio, benzylthio or 1- or 2-phenylethylthio.

$L^2$ and $L^8$ may each also be for example phenylthio, 2-methylphenylthio, 2-methoxyphenylthio or 2-chlorophenylthio.

$R^1$, $R^2$, $L^2$ and $L^8$ and also X may each also be for example methoxy, ethoxy, propoxy, isopropoxy, butoxy, isobutoxy, sec-butoxy, pentyloxy, isopentyloxy, neopentyloxy, tert-pentyloxy, hexyloxy or 2-methylpentyloxy.

$L^2$, $L^8$, $L^{13}$ and $L^{14}$ and also $L^6$ may each also be for example fluorine, chlorine or bromine.

$L^1$, $L^2$ and $L^8$ and also $L^7$ may each also be for example methylsulfonyl, ethylsulfonyl, propylsulfonyl, isopropylsulfonyl, butylsulfonyl, isobutylsulfonyl, secbutylsulfonyl, pentylsulfonyl, isopentylsulfonyl, neopentylsulfonyl, hexylsulfonyl, phenylsulfonyl, 2-methylphenylsulfonyl, 2-methoxyphenylsulfonyl or 2-chlorophenylsulfonyl.

$L^6$ and $L^8$ and also $L^3$ may each also be for example methoxycarbonyl, ethoxycarbonyl, propoxycarbonyl, isopropoxycarbonyl, butoxycarbonyl, isobutoxycarbonyl or sec-butoxycarbonyl.

$R^1$, $R^2$, $L^2$ and $L^8$ may each also be for example 2-methoxyethoxy, 2-ethoxyethoxy, 2- or 3-methoxypropoxy, 2- or 3-ethoxypropoxy, 2- or 4-methoxybutoxy, 2- or 4-ethoxybutoxy, 5-methoxypentyloxy, 5-ethoxypentyloxy, 6-methoxyhexyloxy, 6-ethoxyhexyloxy, benzyloxy or 1- or 2-phenylethoxy.

X may also be for example methylamino, ethylamino, propylamino, isopropylamino or butylamino.

$L^{11}$ and X may each also be for example dimethylamino, diethylamino, dipropylamino, diisopropylamino, dibutylamino or N-methyl-N-ethylamino.

$L^{12}$ may also be for example 2-methoxycarbonylethylthio or 2-ethoxycarbonylethylthio.

$R^3$ may also be for example cyclopentyl, cyclohexyl, cycloheptyl, allyl or methallyl.

$L^9$ may also be for example phenyl, 2-, 3- or 4-methylphenyl, 2,4-dimethylphenyl, 2-, 3- or 4-chlorophenyl, 2-, 3- or 4-methoxyphenyl, 2- or 3-methylthienyl or 2-, 3- or 4-methylpyridyl.

$Y^1$ and $Y^2$ are each for example $(CH_2)_2$, $(CH_2)_3$, $(CH_2)_4$, $(CH_2)_5$, $(CH_2)_6$, $(CH_2)_7$, $(CH_2)_8$, $(CH_2)_9$, $(CH_2)_{10}$, $CH(CH_3)—CH_2$, $CH(CH_3)—(CH(CH_3)$, $C_2H_4—O—C_2H_4$, $C_2H_4—NH—C_2H_4$, $C_2H_4—N(CH_3)—C_2H_4$, $C_2H_4O—C_2H_4O—C_2H_4$, $C_2H_4—NH—C_2H_4—NH—C_2H_4$ or $C_2H_4—N(CH_3)—C_2H_4—N(CH_3)—C_2H_4$.

W is for example methylimino, ethylimino, propylimino, isopropylimino or butylimino.

$L^1$, $L^6$ and $L^7$ may each also be for example formyl, acetyl, propionyl, butyryl, pentanoyl or hexanoyl.

When $L^1$ or $L^7$ is the radical —CH=T wherein T is derived from an acidic CH compound $H_2T$, include suitable acidic CH compounds $H_2T$ are for example compounds of the formula

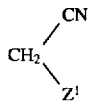
(VIIa)

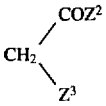
(VIIb)

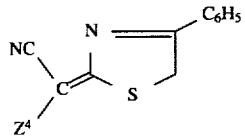
(VIIc)

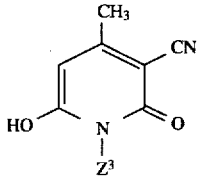
(VIId)

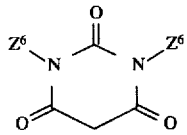
(VIIe)

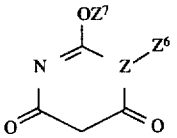
(VIIf)

or

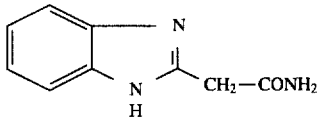
(VIIg)

where $Z^1$ is cyano, nitro, $C_1$–$C_4$-alkanoyl, substituted or unsubstituted benzoyl, $C_1$–$C_4$-alkylsulfonyl, substituted or unsubstituted phenylsulfonyl, carboxyl, $C_1$–$C_4$-alkoxycarbonyl, $C_3$–$C_4$-alkenyloxycarbonyl, phenoxycarbonyl, carbamoyl, mono- or di($C_1$–$C_4$-alkyl)carbamoyl, substituted or unsubstituted phenylcarbamoyl, substituted or unsubstituted phenyl, 2-benzothiazolyl, 2-benzimidazolyl, 5-phenyl-1,3,4-thiadiazol-2-yl or 2-hydroxyquinoxalin-3-yl, $Z^2$ is $C_1$–$C_4$-alkyl, $C_1$–$C_4$-alkoxy or $C_3$–$C_4$-alkenyloxy, $Z^3$ is $C_1$–$C_4$-alkoxycarbonyl, $C_3$–$C_4$-alkenyloxycarbonyl, phenylcarbamoyl or 2-benzimidazolyl, $Z^4$ is cyano, $C_1$–$C_4$-alkoxycarbonyl or $C_3$–$C_4$-alkenyloxycarbonyl, $Z^5$ is hydrogen or $C_1$–$C_6$-alkyl, $Z^6$ is hydrogen, $C_1$–$C_4$-alkyl or phenyl and $Z^7$ is $C_1$–$C_4$-alkyl.

Preference must be given here to the radical derived from compounds of the formula VIIa, VIIb or VIIc wherein $Z^1$ is cyano, $C_1$–$C_4$-alkanoyl, $C_1$–$C_4$-alkoxycarbonyl or $C_3$–$C_4$-alkenyloxycarbonyl, $Z^2$ is $C_1$–$C_4$-alkyl, $C_1$–$C_4$-alkoxy or $C_3$–$C_4$-alkenyloxy, $Z^3$ is $C_1$–$C_4$-alkoxycarbonyl or $C_3$–$C_4$-alkenyloxycarbonyl, and $Z^4$ is cyano Particular emphasis must be given here to the radical derived from compounds of the formula VIIa, VIIb or VIIc wherein $Z^1$ is cyano, $C_1$–$C_4$-alkoxycarbonyl or $C_3$–$C_4$-alkenyloxycarbonyl, $Z^2$ is $C_1$–$C_4$-alkoxy or $C_3$–$C_4$-alkenyloxy, $Z^3$ is $C_1$–$C_4$-alkoxycarbonyl or $C_3$–$C_4$-alkenyloxycarbonyl, and $Z^4$ is cyano.

Preference is given to azo dye polymers which as characteristic monomer units contain radicals of the formula Ia

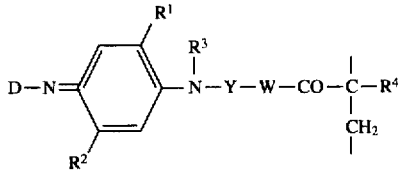
(Ia)

where D, $R^1$, $R^2$, $R^3$, $R^4$, Y and W are each as defined above, and of the abovementioned formula II.

Preference is further given to azo dye polymers where D in formula I is derived from an amine of the formula VIa, VIb, VIc, VId, VIe, VIf, VIm or VIn.

Preference is further given to azo dye polymers in which the proportion of monomer units of the formula I is from 4 to 50, in particular from 8 to 25, mol %, the proportion of monomer units of the formula II is from 51 to 96, in particular from 75 to 92, mol %, the proportion of monomer units of the formula III is from 0 to 30, in particular from 0 to 15, mol % and the proportion of monomer units of the formula IV is from 0 to 50, in particular from 0 to 20 mol %, each percentage being based on the polymer, and the average molecular weight of the polymer is from 1500 to 50,000, in particular from 2000 to 25,000.

Of particular suitability are azo dye polymers in which in the formula I $R^1$ is hydrogen or $C_1$–$C_4$-alkoxy, $R^2$ is $C_1$–$C_4$-alkyl, $C_1$–$C_4$-alkoxy or acetylamino, $R^3$ is $C_1$–$C_4$-alkyl, $R^4$ is hydrogen or methyl, and $Y^1$ is $C_2$–$C_8$-alkylene, and in the formula II $R^4$ is hydrogen or methyl, and X is $C_1$–$C_4$-alkoxy.

Particular preference is given to azo dye polymers in which D is derived from amines of the thiophene or thiazole series, in particular from those of the formula VIb or VId Of special interest are azo dye polymers in which D is derived from an amine of the formula VIb or VId where $L^1$ is nitro, cyano, $C_1$–$C_4$-alkanoyl or a radical of the formula —CH=T, where T is as defined above, $L^2$ is hydrogen, $C_1$–$C_4$-alkyl or halogen, $L^3$ is cyano, $C_1$–$C_4$-alkoxycarbonyl or nitro, $L^7$ is nitro, cyano, $C_1$–$C_4$-alkanoyl or a radical of the formula —CH=T, where T is as defined above, and $L^8$ is hydrogen, $C_1$–$C_4$-alkyl or halogen.

To prepare the polymers of the invention, it is advantageous to employ azo dyes of the formula V

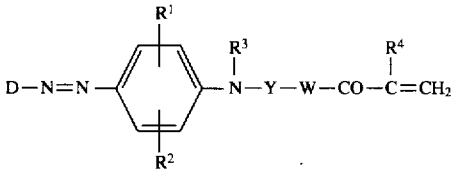

(V)

where D, $R^1$, $R^2$, $R^3$, $R^4$, Y and W are each as defined above.

The novel polymers can be prepared by methods known per se, for example as described in J. Polymer Sci. (loc. cit.).

Conveniently, an azo dye of the formula V is reacted with an acryloyl compound of the formula VIII

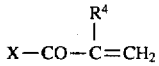

(VIII)

where $R^4$ and X are each as defined above, styrene and a cinnamic ester of the formula IX

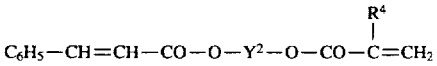

(IX)

where $Y^2$ and $R^4$ are each as defined above, in the above-mentioned molar ratio in an inert solvent (for example toluene or xylene) in the presence of a free radical initiator (for example azobisisobutyronitrile).

The azo dyes of the formula V are known per se and described for example in EP-A-201,896, DE-A-3,108,077, U.S. Pat. No. 4,843,153 or GB-A-1,546,803 or can be obtained by the methods mentioned therein.

The azo dye polymers of the invention are advantageously suitable for use in nonlinear optical systems (see for example Chemistry and Industry, Oct. 1, 1990, pages 600 to 608).

They are particularly suitable for use in communications technology, electrooptical modulators (for example Mach-Zehnder Interferometers), optical switches, frequency mixing or waveguides.

The layers which contain the polymers of the present invention are prepared in the conventional manner, for example by wet or spin coating with a 5–15% by weight solution of the polymer in a solvent (for example tetrachloroethane, methylene chloride or tetrahydrofuran).

Given a suitable substitution pattern (for example an epoxy structure) the novel polymers can also be crosslinked photochemically, thermally or by the action of electron beams.

The novel polymers are notable for good processibility into thin films, high purity a narrow molecular weight distribution, good orientation in an electric field, good long-term stability, high glass transition temperatures and a high electro-optical coefficient.

The Examples which follow will further illustrate the invention.

I. PREPARATION OF MONOMERIC AZO DYES

Dye 1 a) Preparation of Coupling Component 421 g (3.05 mol) of potassium carbonate were suspended in 240 ml of water together with 40 g (0.12 mol) of potassium iodide. With continuous stirring 169 g (1.2 mol) of N-ethyl-m-toluidine in 240 ml of isobutanol were added, followed by 260 g (1.8 mol) of 6-chlorohexanol. Then the reaction mixture was heated to the boil. After 12 hours under reflux, the reaction mixture was cooled down to room temperature, 400 ml of water were added, and the aqueous phase was separated off. The organic phase was washed three times with 400 ml of water each time and dried over sodium sulfate, and the solvent was removed under reduced pressure. The residual oil was subjected to fractional distillation (157°–158° C. at 1.0 mbar). Yield: 231 g (82%).

47 g (0.2 mol) of N-ethyl-N-(6-hydroxyhexyl)-m-toluidine were dissolved in 600 ml of dichloromethane. 42 ml of triethylamine and 2.4 g of hydroquinone were added. The reaction solution was cooled down to 0°–5° C. and 38 ml (0.4 mol) of methacryloyl chloride in 100 ml of dichloromethane were gradually added dropwise. This was followed by 2 hours stirring at that temperature, warming to room temperature and a further 50 hours' stirring. As workup, the organic phase was washed with 300 ml of saturated sodium bicarbonate solution and then twice with 300 mol of sodium chloride solution each time. After drying over sodium sulfate and concentrating of the solvent, the crude produce was purified by column chromatography over silica gel using 94:5 v/v toluene/methanol as mobile phase. Yield: 44 g (71%) of the aniline of the formula

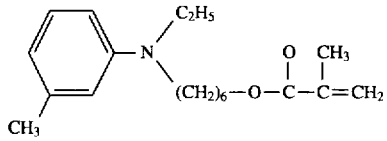

b) Preparation of Azo Dye 6.4 (0.035 mol) of 2-amino-4-chloro-3,5-dicyanothiophene were suspended in 100 ml of 17:3 v/v glacial acetic acid/propionic acid. Then 14 ml of 85% by weight sulfuric acid were added dropwise at room temperature and 6 ml of nitrosylsulfuric acid dropwise at 0° to 5° C. After stirring at from 0° to 5° C. for 3 hours, the resulting diazomium salt solution was added dropwise to 10.9 g (0.036 mol) of the coupling component described under a) in 300 g of ice-water, 20 ml of concentrated hydrochloric acid and 1 g of amidosulfuric acid at <5° C. and at a pH 1–1.5. The pH was maintained at 1–1.5 by the dropwise addition of 20% by weight sodium hydroxide solution. After stirring overnight at room temperature the precipitated dye was filtered off with suction, washed with water, dried and chromatographed twice over silica gel using 95:5 v/v hexane/acetone as mobile phase.

Yield: 10 g (57%) of the dye of the formula

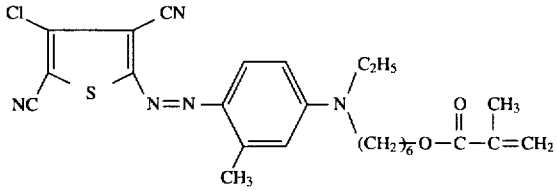

$C_{25}H_{28}N_5SO_2Cl$ (498.0)

calculated: C, 60.29; H, 5.67; N, 14.06; S, 6.43; O, 6.43.

found: C, 60.31; H, 5.75; N, 13.99; S, 6.40; O, 6.43.

The same method gives the dyes of the formula
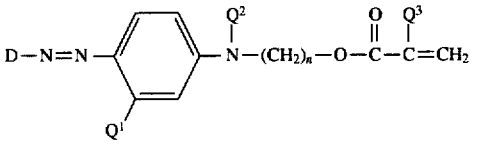
listed below in Table 1.
TABLE 1
| Dye No | D | $Q^1$ | $Q^2$ | $Q^3$ | n |
|---|---|---|---|---|---|
| 2 | 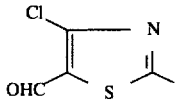 | H | $C_2H_5$ | $CH_3$ | 2 |
| 3 | 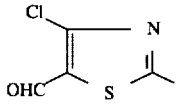 | $CH_3$ | $C_2H_5$ | $CH_3$ | 6 |
| 4 | 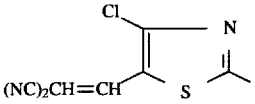 | H | $C_2H_5$ | $CH_3$ | 2 |
| 5 | 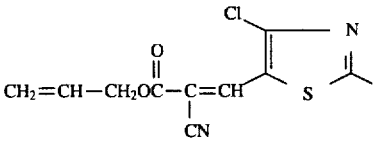 | H | $C_2H_5$ | $CH_3$ | 2 |
| 6 | 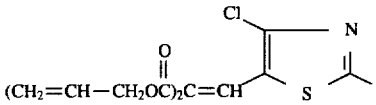 | H | $C_2H_5$ | $CH_3$ | 2 |
| 7 | 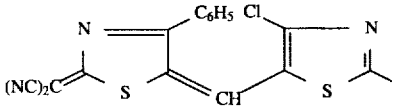 | H | $C_2H_5$ | $CH_3$ | 2 |
| 8 | 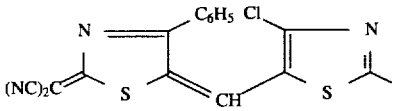 | $CH_3$ | $C_2H_5$ | $CH_3$ | 6 |
| 9 | 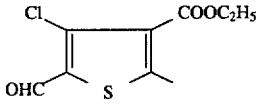 | H | $C_2H_5$ | $CH_3$ | 2 |
| 10 | 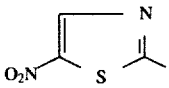 | H | $C_2H_5$ | $CH_3$ | 2 |
| 11 | 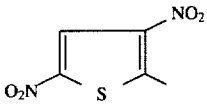 | H | $C_2H_5$ | $CH_3$ | 2 |
| 12 | 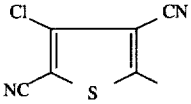 | $CH_3$ | $C_2H_5$ | $CH_3$ | 2 |

TABLE 1-continued

| Dye No | D | $Q^1$ | $Q^2$ | $Q^3$ | n |
|---|---|---|---|---|---|
| 13 | 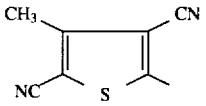 | $CH_3$ | $C_2H_5$ | $CH_3$ | 6 |
| 14 | 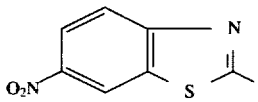 | $CH_3$ | $C_2H_5$ | $CH_3$ | 6 |
| 15 | 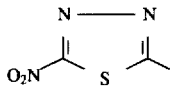 | H | $C_2H_5$ | $CH_3$ | 2 |
| 16 | 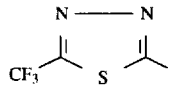 | $CH_3$ | $C_2H_5$ | $CH_3$ | 6 |
| 17 | 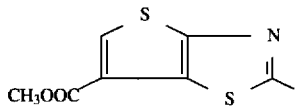 | $CH_3$ | $C_2H_5$ | $CH_3$ | 6 |
| 18 | 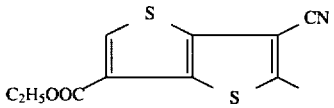 | $CH_3$ | $C_2H_5$ | $CH_3$ | 6 |
| 19 | 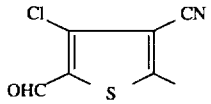 | $CH_3$ | $C_2H_5$ | $CH_3$ | 6 |

II) PREPARATION OF POLYMER

General polymerization method for preparing polyacrylates of the following formula:

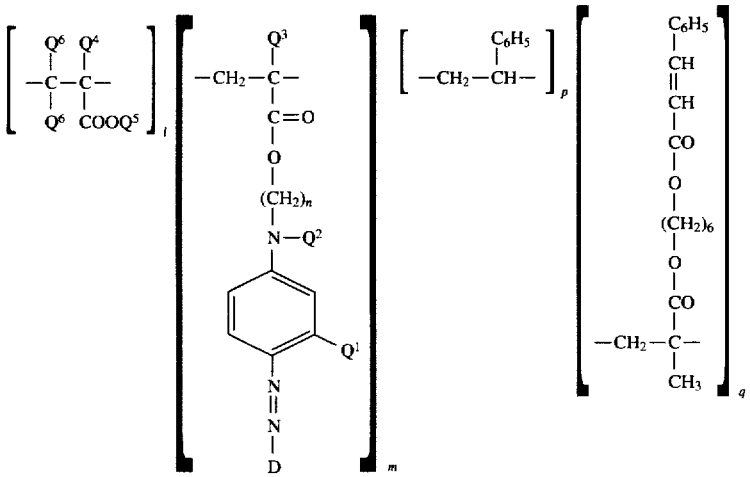

(The indices l, m, p and q express the mole percentages of the respective monomer units, based on the polymer.)

In a Schlenk vessel, a monomer solution comprising n mol % of dye monomer and l+p+q mol % of comonomer in absolute toluene was admixed with 2 mol % of azobisisobutyronitrile. After argon had been passed through the monomer mixture for 10 minutes, the monomer mixture was thermostabilized at 50° C. The polymerization was complete after 100 hours. The polymers were precipitated with methanol and reprecipitated twice from hexane/methanol. (If monomer is still present, it can be separated off by column chromatography over silica gel, for example using 9:1 v/v toluene/ethyl acetate as mobile phase.) After the solvent had been removed, the polymer was dried in a high vacuum. The quantitative composition of the copolymers was determined by means of UV spectroscopy and elemental analysis. The molecular weights were determined by gel permeation chromatography. The glass transition temperature of the polymer was determined by differential scanning calorimetry.

TABLE 2

| Example No | l | m | p | q | $Q^4$ | $Q^5$ | $Q^6$ | Dye No | Average molecular weight | $T_g$ [°C.] |
|---|---|---|---|---|---|---|---|---|---|---|
| 1 | 90 | 10 | 0 | 0 | $CH_3$ | $CH_3$ | H | 9 | 16807 | 125 |
| 2 | 90 | 10 | 0 | 0 | $CH_3$ | $CH_3$ | H | 3 | 22491 | 120 |
| 3 | 90 | 10 | 0 | 0 | $CH_3$ | $CH_3$ | H | 5 | 11594 | 151 |
| 4 | 90 | 10 | 0 | 0 | $CH_3$ | $CH_3$ | H | 10 | 3770 | 105 |
| 5 | 90 | 10 | 0 | 0 | $CH_3$ | $CH_3$ | H | 11 | 2661 | 95 |
| 6 | 80 | 20 | 0 | 0 | $CH_3$ | $CH_3$ | H | 2 | 13072 | 150 |
| 7 | 80 | 20 | 0 | 0 | $CH_3$ | $CH_3$ | H | 3 | 11062 | 155 |
| 8 | 88 | 12 | 0 | 0 | $CH_3$ | $CH_3$ | H | 3 | 11489 | 145 |
| 9 | 90 | 10 | 0 | 0 | $CH_3$ | $CH_3$ | H | 6 | | |
| 10 | 90 | 10 | 0 | 0 | $CH_3$ | $CH_3$ | H | 13 | 14685 | 86 |
| 11 | 90 | 10 | 0 | 0 | $CH_3$ | $CH_2-CH(O)-CH_2$ | H | 2 | 13434 | 125 |
| 12 | 90 | 10 | 0 | 0 | $CD_3$ | $CD_3$ | D | 3 | 18384 | 130 |
| 13 | 80 | 10 | 0 | 10 | $CH_3$ | $CH_3$ | H | 3 | | |
| 14 | 80 | 10 | 10 | 0 | $CH_3$ | $CH_3$ | H | 3 | 2877 | |
| 15 | 50 | 50 | 0 | 0 | $CH_3$ | $CH_3$ | H | 3 | | |
| 16 | 0 | 100 | 0 | 0 | $CH_3$ | $CH_3$ | H | 3 | | |
| 17 | 90 | 10 | 0 | 0 | $CH_3$ | $CH_3$ | H | 17 | | 90 |
| 18 | 90 | 10 | 0 | 0 | $CH_3$ | $CH_3$ | H | 18 | | 100 |

We claim:

[1. An azo dye polymer containing as characteristic monomer unit radicals of the formulae I, II, III and IV

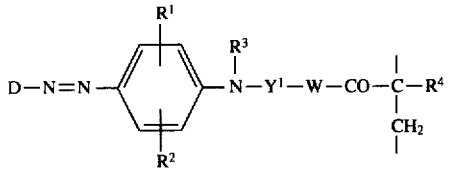

(I)

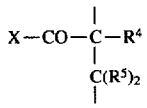

(II)

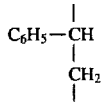

(III)

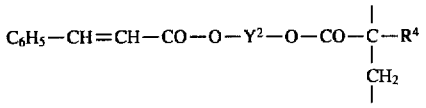

(IV)

where

D is the radical of the diazo component derived from a five-membered aromatic heterocyclic amine having one to three hetero atoms selected from the group consisting of nitrogen, oxygen and sulfur in the heterocyclic ring and optionally fused to a benzene, thiophene, pyridine or pyrimidine ring, $R^1$ and $R^2$ are each independently of the other hydrogen, $C_1$–$C_6$-alkyl or $C_1$–$C_6$-alkoxy optionally substituted by phenyl or $C_1$–$C_4$-alkoxy, and $R^2$ may also be $C_1$–$C_4$-alkanoylamino, $R^3$ is hydrogen, $C_1$–$C_6$-alkyl, $C_5$–$C_7$-cycloalkyl or $C_3$–$C_4$-alkenyl, $R^4$ is hydrogen, deuterium, methyl, trideuterated methyl or chlorine, $R^5$ is hydrogen or deuterium, $Y^1$ and $Y^2$ are each independently of the other $C_2$–$C_{10}$-alkylene optionally interrupted by 1 to 3 oxygen atoms in the ether function of imino or $C_1$–$C_4$-alkylimino groups, W is oxygen, imino or $C_1$–$C_4$-alkylimino, and X is hydroxyl, $C_1$–$C_6$-alkoxy, trideuterated methoxy, 2,3-epoxypropoxy, phenoxy, amino or $C_1$–$C_4$-mono- or -dialkylamino.

the proportion of monomer units of the formula I being from 1 to 100 mol %, the proportion of monomer units of the formula II being from 0 to 99 mol %, the proportion of monomer units of the formula III being from 0 to 99 mol % and the proportion of monomer units of the formula IV being from 0 to 75 mol %, each percentage being based on the polymer, and the average molecular weight of the polymer being from 1,000 to 100,000.]

[2. An azo dye polymer as claimed in claim 1, wherein D is derived from a heterocyclic amine of the pyrrole, furan, thiophene, pyrazole, imidazole, oxazole, isoxazole, thiazole, isothiazole, triazole, oxadiazole, thiadiazole, benzofuran, benzothiophene, benzimidazole, benzoxazole, benzothiazole, benzoisothiazole, pyridothiophene, pyrimidithiophene, thienothiophene or thienothiazole series.]

3. An azo dye polymer as claimed in claim 1, wherein in formula (I) D is

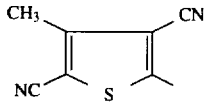

$R^1$ is hydrogen, $R^2$ is methyl, $R^3$ is ethyl, $Y^1$ is hexylene, W is oxygen and $R^4$ is methyl.

*4. An azo dye polymer containing as characteristic monomer units radicals of the formulae I, II, III and IV*

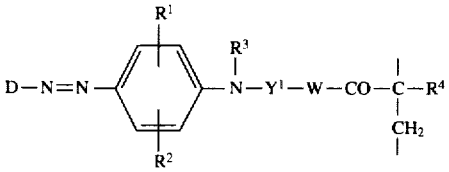

(I)

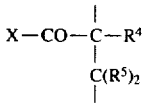

(II)

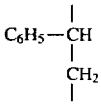

(III)

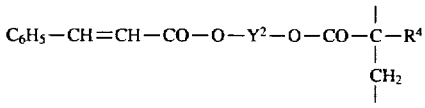

(IV)

*wherein*

*D is the radical of a diazo component derived from a compound selected from the group consisting of:*

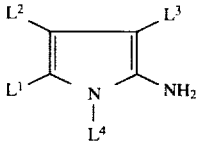

(VIa)

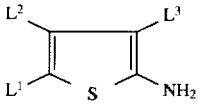

(VIb)

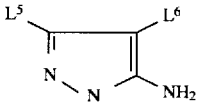

(VIc)

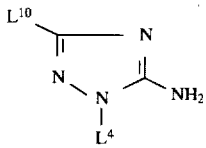

(VIf)

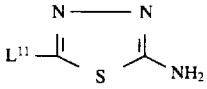

(VIg)

-continued

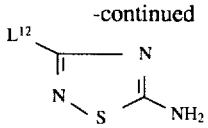

(VIh)

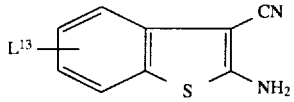

(VIi)

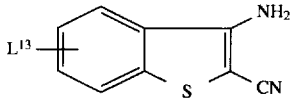

(VIj)

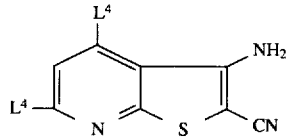

(VIm)

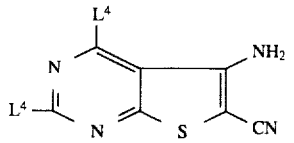

(VIn)

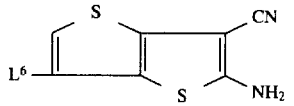

(VIo)

and

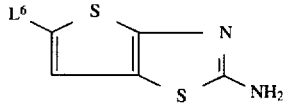

(VIp)

*wherein*

*$L^1$ is nitro, cyano, $C_1$–$C_6$-alkanoyl, benzoyl, $C_1$–$C_6$-alkylsulfonyl, substituted or unsubstituted phenylsulfonyl or a radical of the formula —CH=T, where T is the radical of an acidic CH compound,*

*$L^2$ is hydrogen, $C_1$–$C_6$-alkyl, halogen, hydroxyl, mercapto, unsubstituted or phenyl- or $C_1$–$C_4$-alkoxy-substituted $C_1$–$C_6$-alkoxy, substituted or unsubstituted phenoxy, unsubstituted or phenyl-substituted $C_1$–$C_6$-alkylthio, substituted or unsubstituted phenylthio, $C_1$–$C_6$-alkylsulfonyl or substituted or unsubstituted phenylsulfonyl,*

*$L^3$ is cyano, $C_1$–$C_4$-alkoxycarbonyl or nitro,*

*$L^4$ is hydrogen, $C_1$–$C_6$-alkyl or phenyl,*

*$L^5$ is $C_1$–$C_6$-alkyl or phenyl,*

*$L^6$ is cyano, $C_1$–$C_4$-alkoxycarbonyl, $C_1$–$C_6$-alkanoyl or halogen,*

*$L^{10}$ is phenyl or pyridyl,*

*$L^{11}$ is trifluoromethyl, nitro $C_1$–$C_6$-alkyl, phenyl, unsubstituted or phenyl-substituted $C_1$–$C_6$-alkylthio or $C_1$–$C_4$-dialkylamino,*

*$L^{12}$ is $C_1$–$C_6$-alkyl, phenyl, 2-cyanoethylthio or 2-($C_1$–$C_4$-alkoxycarbonyl)ethylthio, and*

*$L^{13}$ is hydrogen, nitro or halogen;*

*$R^1$ and $R^2$ are each independently of the other hydrogen, $C_1$–$C_6$-alkyl or $C_1$–$C_6$-alkoxy optionally substituted by phenyl or $C_1$–$C_4$-alkoxy, and $R^2$ may also be $C_1$–$C_4$-alkanoylamino,*

*$R^3$ is hydrogen, $C_1$–$C_6$-alkyl, $C_5$–$C_7$-cycloalkyl or $C_3$–$C_4$-alkenyl,*

*$R^4$ is hydrogen, deuterium, methyl, trideuterated methyl or chlorine,*

*$R^5$ is hydrogen or deuterium,*

*$Y^1$ and $Y^2$ are each independently of the other $C_2$–$C_{10}$-alkylene optionally interrupted by 1 to 3 oxygen atoms in the ether function of imino or $C_1$–$C_4$-alkylimino groups,*

*W is oxygen, imino or $C_1$–$C_4$-alkylimino, and*

*X is hydroxyl, $C_1$–$C_6$-alkoxy, trideuterated methoxy, 2,3-epoxypropoxy, phenoxy, amino or $C_1$–$C_4$-mono- or -dialkylamino, the proportion of monomer units of the formula I being from 1 to 100 mol %, the proportion of monomer units of the formula II being from 0 to 99 mol %, the proportion of monomer units of the formula III being from 0 to 99 mol % and the proportion of monomer units of the formula IV being from 0 to 75 mol %, each percentage being based on the polymer, and the average molecular weight of the polymer being from 1,000 to 100,000.*

* * * * *